US012783243B2

(12) United States Patent
Durbhakula

(10) Patent No.: US 12,783,243 B2
(45) Date of Patent: Nov. 3, 2026

(54) OPERATING SYSTEM SCHEDULER ENHANCEMENTS FOR IMPROVING PERFORMANCE OF MULTIPLE SINGLE THREADED WORKLOADS

(71) Applicant: QUALCOMM Incorporated, San Diego, CA (US)

(72) Inventor: Suryanarayana Murthy Durbhakula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/676,311

(22) Filed: May 28, 2024

(65) Prior Publication Data

US 2025/0370753 A1 Dec. 4, 2025

(51) Int. Cl.
*G06F 9/00* (2018.01)
*G06F 9/38* (2018.01)

(52) U.S. Cl.
CPC .................................. *G06F 9/3836* (2013.01)

(58) Field of Classification Search
CPC ............................. G06F 9/3836; G06F 9/3851
See application file for complete search history.

(56) References Cited

U.S. PATENT DOCUMENTS 10,581,751 B1 * 3/2020 Viswanathan ........ G06F 3/0605
2018/0032373 A1 * 2/2018 Chen .................... G06F 9/5038
2025/0370753 A1 * 12/2025 Durbhakula .......... G06F 9/3836

FOREIGN PATENT DOCUMENTS

CN 114691324 A * 7/2022 ........... G06F 9/4881
GB 2492457 A * 1/2013 ........... G06F 9/3851

OTHER PUBLICATIONS

Keckler et al., "Processor Coupling: Artificial Integrating Compile Time and Runtime Scheduling for Parallelism", 1992,ACM,pp. 1-26 (Year: 1992).*

* cited by examiner

*Primary Examiner* — Alexander Khong
(74) *Attorney, Agent, or Firm* — Seyfarth Shaw LLP

(57) ABSTRACT

A method includes determining a parallelism value for each pending process of a set of pending processes based on instruction level parallelism or memory level parallelism for the pending processes, where each pending process is a single-threaded process. The method also includes sorting each pending process based on the process' parallelism value. The method further includes determining, from the set of pending processes, a set of scheduled processes for a processor based on a parallelism threshold associated with the processor, a process threshold associated with the processor, and the sorting. The set of scheduled processes is determined by adding pending processes to the set of scheduled processes unless a quantity of scheduled processes equals the process threshold. The set of scheduled processes is also determined by removing pending processes from the set of pending processes once the respective pending process is added to the set of scheduled processes.

20 Claims, 6 Drawing Sheets

OPERATING SYSTEM SCHEDULER ENHANCEMENTS FOR IMPROVING PERFORMANCE OF MULTIPLE SINGLE THREADED WORKLOADS

FIELD OF THE DISCLOSURE

Aspects of the present disclosure generally relate to multi-program processing, and more particularly to scheduler enhanements for improving performance of multi-process workloads.

BACKGROUND

Process scheduling is a method in which a computer operating system manages the execution of programs on a processor by determining the order of execution for pending processes. The order of execution, also referred to as a schedule, includes a sequence of scheduled processes and processing units assigned to execute each scheduled process. Process scheduling enhances system efficiency by improving throughput, wait time, and latency of program execution. Furthermore, process scheduling incorporates techniques to balance loads and prioritize tasks.

Process scheduling affects the performance of the processor particularly in the context of memory level parallelism (MLP) and instruction level parallelism (ILP). MLP is the processor's ability to have multiple pending memory operations, such as cache misses or translation lookaside buffer misses, at one time. Similarly, ILP refers to the capability of the processor to execute multiple instructions simultaneously. Processors affect MLP and ILP by determining the sequence of instruction execution and altering the dependencies between executed instructions, availability of resources, and latency of memory operations.

SUMMARY

In some aspects of the present disclosure, a method includes determining a parallelism value for each pending process of a set of pending processes based on instruction level parallelism or memory level parallelism for the pending processes. Each pending process is a single-threaded process. The method also includes sorting each pending process based on the process' parallelism value. The method further includes determining, from the set of pending processes, a set of scheduled processes for a processor based on a parallelism threshold associated with the processor, a process threshold associated with the processor, and the sorting. The set of scheduled processes is determined by adding pending processes to the set of scheduled processes unless a quantity of scheduled processes equals the process threshold. The set of scheduled processes is also determined by removing pending processes from the set of pending processes once the respective pending process is added to the set of scheduled processes.

Other aspects of the present disclosure are directed to an apparatus. The apparatus has at least one memory and one or more processors coupled to the at least one memory. The processor(s) is configured to determine a parallelism value for each pending process of a set of pending processes based on instruction level parallelism or memory level parallelism for the pending processes. Each pending process is a single-threaded process. The processor(s) is also configured to sort each pending process based on the process' parallelism value. The processor(s) is further configured to determine, from the set of pending processes, a set of scheduled processes for a processor based on a parallelism threshold associated with the processor, a process threshold associated with the processor, and the sorting. The set of scheduled processes is determined by adding pending processes to the set of scheduled processes unless a quantity of scheduled processes equals the process threshold. The set of scheduled processes is also determined by removing pending processes from the set of pending processes once the respective pending process is added to the set of scheduled processes.

In still other aspects of the present disclosure, a non-transitory computer-readable medium with program code recorded thereon is disclosed. The program code is executed by at least one processor and includes program code to determine a parallelism value for each pending process of a set of pending processes based on instruction level parallelism or memory level parallelism for the pending processes. Each pending process is a single-threaded process. The program code also includes program code to sort each pending process based on the process' parallelism value. The program code further includes program code to determine, from the set of pending processes, a set of scheduled processes for a processor based on a parallelism threshold associated with the processor, a process threshold associated with the processor, and the sorting. The set of scheduled processes is determined by adding pending processes to the set of scheduled processes unless a quantity of scheduled processes equals the process threshold. The set of scheduled processes is also determined by removing pending processes from the set of pending processes once the respective pending process is added to the set of scheduled processes.

Other aspects of the present disclosure are directed to an apparatus. The apparatus includes means for determining a parallelism value for each pending process of a set of pending processes based on instruction level parallelism or memory level parallelism for the pending processes. Each pending process is a single-threaded process. The apparatus also includes means for sorting each pending process based on the process' parallelism value. The apparatus further includes means for determining, from the set of pending processes, a set of scheduled processes for a processor based on a parallelism threshold associated with the processor, a process threshold associated with the processor, and the sorting. The set of scheduled processes is determined by adding pending processes to the set of scheduled processes unless a quantity of scheduled processes equals the process threshold. The set of scheduled processes is also determined by removing pending processes from the set of pending processes once the respective pending process is added to the set of scheduled processes.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
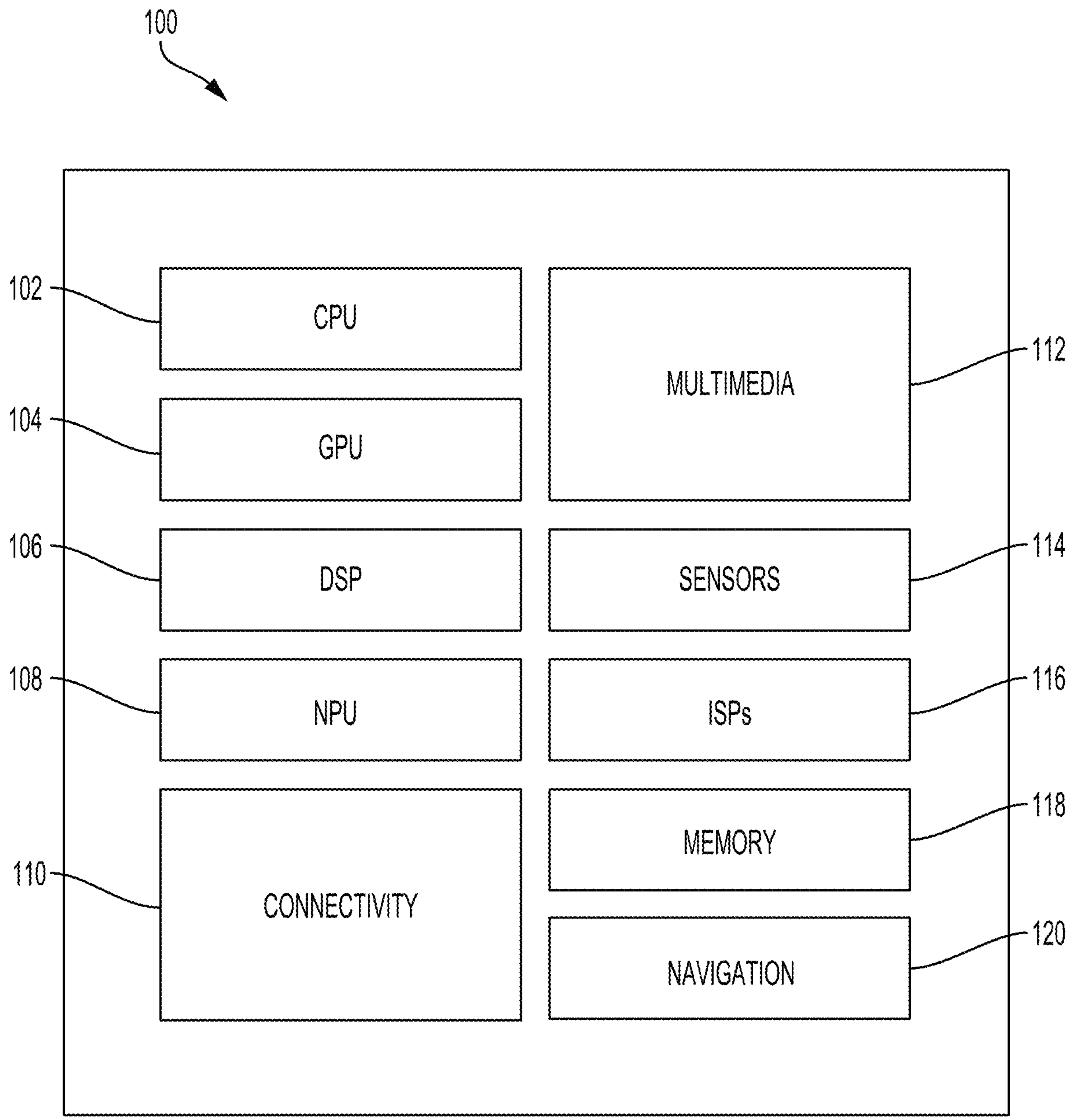
FIG. 1 illustrates an example implementation of a system-on-a-chip (SOC), in accordance with various aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Several aspects of process scheduling systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware and software.

As described, process scheduling is a method in which a computer operating system manages the execution of programs on a processor by determining the order of execution for pending processes. A scheduler integrated within a processor determines the order of execution by assigning the pending processes to processing units. The scheduler may also load balance each processing unit by selectively assigning pending processes based on anticipated resource specifications. For example, the scheduler may attempt to increase system throughput by selectively assigning pending processes to processing units such that the processes are evenly distributed to the processing units based on anticipated resource specifications.

The scheduler may account for only so many aspects of resource availability. Pending processes may have many varying attributes, making it difficult for the scheduler to holistically schedule each process. For example, processes may have different dependencies, memory specifications, arithmetic specifications, priorities, and execution times. The scheduler may not be able to account for every attribute of every process. Additionally, the scheduler is limited by the processing units employed by the processor. For example, the scheduler may account for the memory limitations of the processing units when scheduling each pending process to a processing unit. Therefore, a solution is needed to better schedule pending processes based on the anticipated resource usage of each process.

Various aspects of the present disclosure are directed to methods for scheduling pending processes. In some examples, a processor determines a parallelism value for each pending process of a set of pending processes based on instruction level parallelism (ILP) or memory level parallelism (MLP) for the respective pending process. The processor may then sort the set of pending processes based on the parallelism values. After the processor sorts the pending processes, the processor may then schedule processes based on a parallelism threshold and a process threshold associated with the processor. The parallelism threshold may be based on a capability of the processor, such as a memory miss capability or an issue capability. The process threshold may be based on the quantity of processes that the processor, or a core of the processor, can support in concurrent or parallel execution.

The processor may begin by scheduling processes having a smallest or largest parallelism value. Once the processor schedules a process, the processor may then calculate a difference between the parallelism values for the scheduled processes and the parallelism threshold. The processor may then proceed by scheduling processes having parallelism values that do not exceed the calculated difference. The processor may continue scheduling processes and recalculating the difference until no pending processes remain, the process threshold is satisfied, or no more processes may be scheduled without the processor exceeding the parallelism threshold.

Particular aspects of the subject matter described in this disclosure can be implemented to realize one or more of the following potential advantages. In some examples, the described techniques, such as scheduling processes based on a parallelism threshold and a process threshold, improves system utilization as compared to conventional techniques. Other advantages include improved system throughput and reduced algorithmic complexity. The disclosure also includes techniques to avoid process starvation.

FIG. 1 illustrates an example implementation of a system-on-a-chip (SOC) 100, which may include a central processing unit (CPU) 102 or a multi-core CPU configured for process scheduling. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM, RISC-V (RISC-five), or any reduced instruction set computing (RISC) architecture. In aspects of the present disclosure, the instructions loaded into the CPU 102 may include code to determine a parallelism value for each pending process of a set of pending processes based on ILP or MLP for the respective pending process. Each pending process of the set of pending processes may be a single-threaded process. The instructions loaded into the CPU 102 may also include code to sort each pending process based on the respective process' parallelism value. The instructions loaded into the CPU 102 may additionally include code to determine, from the set of pending processes, a set of scheduled processes for a processor based on a parallelism threshold associated with the processor, a process threshold associated with the processor, and the sorting. The set of scheduled processes may be determined by adding pending processes to the set of scheduled processes unless a quantity of scheduled processes is equal to the process threshold. The set of scheduled processes may further be determined by removing pending processes from the set of pending processes once the respective pending process is added to the set of scheduled processes.

According to aspects of the present disclosure, an apparatus includes a process scheduler. The apparatus may include means for determining, means for sorting, means for adding, means for calculating, and means for removing. For example, the means for determining may be any of the CPU 102, GPU 104, DSP 106, NPU 108, ISP 116, or memory block 118. For example, the means for sorting may be any of the CPU 102, GPU 104, DSP 106, NPU 108, ISP 116, or memory block 118. For example, the means for adding may be any of the CPU 102, GPU 104, DSP 106, NPU 108, ISP 116, or memory block 118. For example, the means for calculating may be any of the CPU 102, GPU 104, DSP 106, NPU 108, or ISP 116. For example, the means for removing may be any of the CPU 102, GPU 104, DSP 106, NPU 108, or ISP 116. In other aspects, the aforementioned means may be any structure or any material configured to perform the functions recited by the aforementioned means.

In computer systems, resource utilization and throughput are impacted by the set of processes that are scheduled together. Generally, if a scheduler schedules multiple processes on a multi-core CPU, the overall performance and utilization of the system depends on the resource usage of the processes that are scheduled together. For example, if a multi-core processor scheduler schedules multiple processes having low memory level parallelism (MLP) together, then the system may become under-utilized. Additionally, the system may become under-utilized if the scheduler only schedules processes having low instruction level parallelism (ILP). The scheduler may therefore improve resource utilization and throughput by accounting for the ILP and MLP of active processes during scheduling.

According to aspects of the present disclosure, a processor may include hardware performance counters that track the ILP and MLP of each process. The counters may be stored in the process control block of an operating system and may track cumulative data for past processes. For example, the counters may record the ILP or MLP values for the last n scheduling quanta per process, where n may be any positive number. The scheduler may then schedule processes based on the ILP or MLP values associated with each pending process. Additionally, the scheduler may avoid starvation by scheduling processes that exceed an age threshold.

Figure 2:
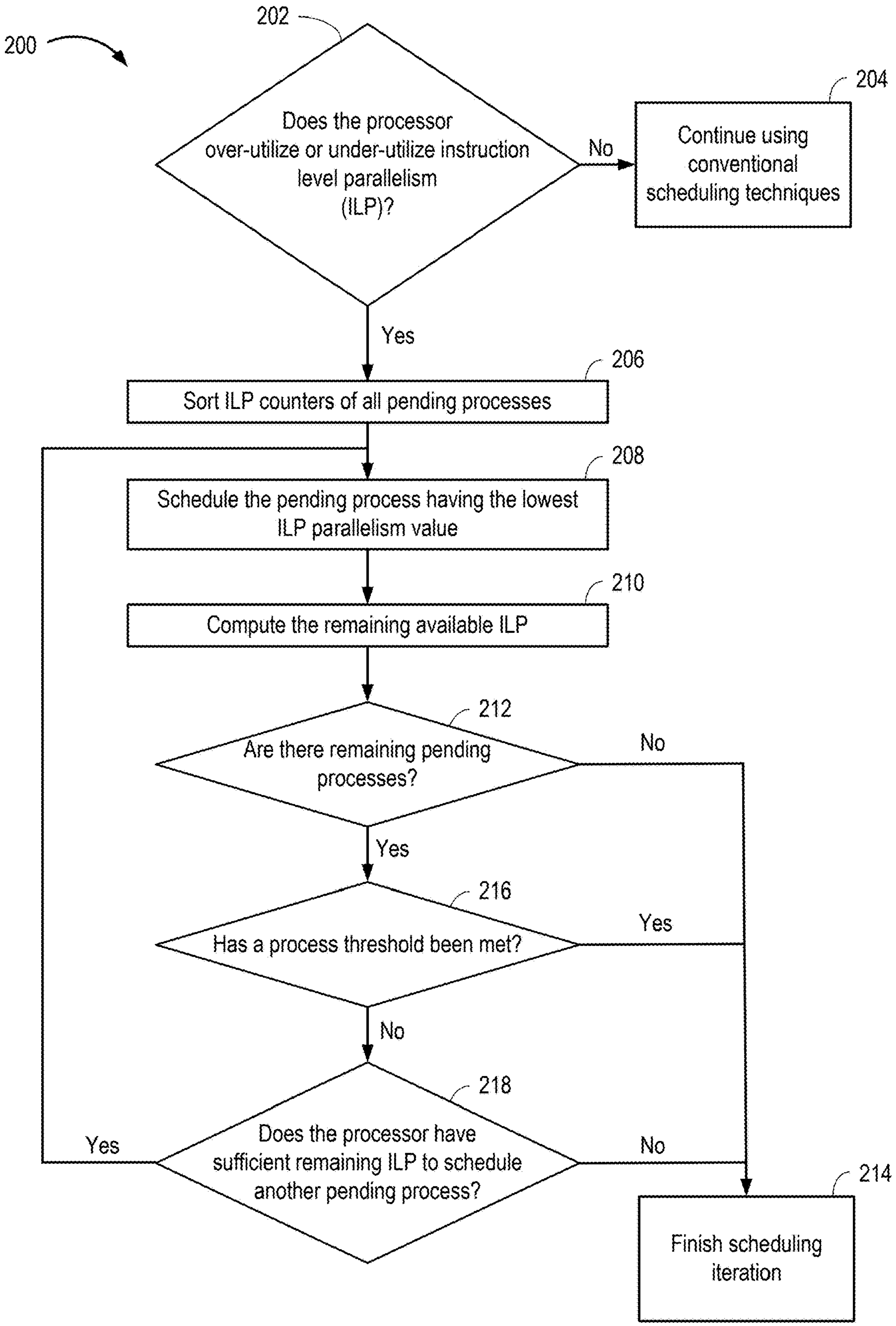
FIG. 2 is a flow diagram illustrating a scheduling process for a multi-threaded single-core processor, in accordance with various aspects of the present disclosure.

FIG. 2 is a flow diagram illustrating a scheduling process 200 for a multi-threaded single-core processor, in accordance with various aspects of the present disclosure. In the example illustrated with respect to FIG. 2, a multi-threaded single-core processor includes a process scheduler that assigns pending processes to each thread. Because each thread shares resources, the scheduler may schedule processes based on anticipated resource usage of each process. In some examples, the scheduler may schedule processes based on ILP or MLP associated with the process. For instance, if the scheduler can schedule only two threads for simultaneous execution, then the scheduler may schedule one high ILP process and one low ILP process. Scheduling two high ILP processes may cause a system resource shortage, while scheduling two low ILP processes may cause system resources to be under-utilized. Additionally, the scheduler may anticipate resource usage based on past system behavior collected from ILP and/or MLP counter data.

The processor's operating system may include hardware performance counters stored in a process control block. The counters may track ILP and MLP for each process as parallelism values. For example, a memory intensive process may have a counter storing a high MLP parallelism value. The counters may implement sliding window techniques to indicate the ILP or MLP of a process for a last n scheduling quanta, where n is a positive number. If the operating system makes a scheduling decision, the operating system may implement the process 200 to schedule processes based on ILP and MLP. Although the example illustrated with respect to FIG. 2 includes scheduling processes based on ILP, the process 200 may also use the same techniques to schedule processes based on MLP.

At block 202, the scheduler determines if the processor over-utilizes or under-utilizes ILP. For example, the processor may execute multiple processes simultaneously, each process having code dependencies. Because each process has code dependencies, the scheduler may determine that the processor is under-utilizing ILP. If the scheduler determines that the processor is not over-utilizing or under-utilizing ILP, then the scheduler may continue to implement conventional scheduling techniques at block 204. If the scheduler determines that the processor is over-utilizing or under-utilizing ILP, then the process 200 proceeds to block 206.

At block 206, the scheduler sorts the ILP counters of each pending process. For example, the set of pending processes may include six processes: P1, P2, P3, P4, P5, and P6. Process P1 may have an ILP parallelism value of one, P2 may have an ILP parallelism value of two, P3 may have an ILP parallelism value of three, P4 may have an ILP parallelism value of six, P5 may have an ILP parallelism value of four, and P6 may have an ILP parallelism value of five. Therefore, the sorted ILP counters may have parallelism values 6, 5, 4, 3, 2, and 1 for processes P4, P6, P5, P3, P2, and P1, respectively.

At block 208, the scheduler schedules the pending process having the lowest ILP parallelism value. The scheduler then computes the remaining available ILP at block 210. The scheduler may then determine whether to schedule another pending process or to finish the scheduling iteration. For instance, at block 212, the scheduler determines if there are remaining pending processes. If there are no remaining pending processes, the scheduler finishes the scheduling iteration at block 214. If there are remaining pending processes, the scheduler determines if a process threshold has been met at block 216. The process threshold may be based on a thread capability of the processor. If the quantity of scheduled processes is equal to or greater than the process threshold, the process threshold is met, and the scheduler may finish the scheduling iteration at block 214. If the quantity of scheduled processes is less than the process threshold, the process threshold is not met, and the scheduler may continue to block 218.

At block 218, the scheduler determines if the processor has sufficient remaining ILP to schedule another pending process. If the processor does not have sufficient remaining ILP to schedule another pending process, the scheduler may finish the scheduling iteration at block 214. For example, if the processor has a remaining ILP of four, but no pending processes have a parallelism value that is equal to or less than four, then the processor does not have sufficient remaining ILP to schedule another pending process. If the processor does have sufficient remaining ILP to schedule another pending process, the scheduler schedules the pending process having the lowest ILP parallelism value at block 208. The scheduler may then continue scheduling processes until the scheduler finishes the scheduling iteration at block 214.

In one example, a multi-threaded processor is eight-issue and can execute up to four threads simultaneously. The sorted ILP counters may have parallelism values 6, 5, 4, 3, 2, and 1 for pending processes P4, P6, P5, P3, P2, and P1, respectively. The scheduler may first schedule the pending process having the lowest parallelism value, P1. The scheduler may then compute the difference between the parallelism value of the scheduled processes and the issue capability of the processor to determine that the processor has a remaining available ILP of seven. Next, the scheduler may schedule the pending process having the next lowest parallelism value, P2. The scheduler may then compute the difference between the parallelism value of the scheduled processes and the issue capability of the processor to determine that the processor has a remaining available ILP of five.

In some implementations, the scheduler may continue to schedule processes having a lowest parallelism value until no pending processes remain unscheduled, all four threads are occupied, or no remaining pending processes have a parallelism value that is less than the difference between the parallelism value of the scheduled processes and the issue capability of the processor. It is also contemplated that the scheduler may implement techniques to decrease the difference between the parallelism value of the scheduled processes and the issue capability of the processor. For example, the scheduler may schedule P1 and P2. Instead of scheduling P3, the pending process with the lowest parallelism value, the scheduler may determine that the remaining available ILP (e.g., five) only allows for one more of the pending processes to be scheduled. Because the scheduler can only schedule one more of the pending processes, the scheduler may transition from scheduling processes with a lowest parallelism value to scheduling processes with a highest parallelism value not exceeding the remaining available ILP. For instance, the scheduler may schedule P6, the remaining pending process with the highest parallelism value that does not exceed the available ILP.

It is also contemplated that the scheduler may prioritize pending processes having a highest parallelism value that does not exceed the available ILP. For example, the sorted ILP counters may have parallelism values 6, 5, 4, 3, 2, and 1 for pending processes P4, P6, P5, P3, P2, and P1, respectively. The scheduler may first schedule the pending process having the highest parallelism value, P4. After computing the available ILP as two, the scheduler may schedule P2, the pending processes having the highest parallelism value that does not exceed the available ILP. The scheduler then has no remaining available ILP to schedule more pending processes.

In a first implementation discussed with respect to FIG. 2, the scheduler is able to fully utilize the available ILP by scheduling the two processes having the highest parallelism value not exceeding the available ILP. In a second implementation, the scheduler is able to fully utilize the available ILP by scheduling the two processes having the lowest parallelism value and, once the scheduler can only schedule one more process, scheduling the process having the highest parallelism value not exceeding the available ILP. The second implementation utilizes one more thread than the first implementation, while both implementations fully utilize available ILP.

The scheduler may additionally track an age value for each pending process and schedule pending processes having an age value above an age threshold. For example, the scheduler may track the amount of cycles that each pending process has remained unscheduled. The age threshold in this example may be n, where n can be any positive number. If a process has been pending for n cycles, then the scheduler may schedule the process before scheduling other pending processes. Additionally, or alternatively, if a process has been pending for n cycles, then the scheduler may schedule the process in the next scheduling quanta. Other implementations of age values and age thresholds are contemplated, such as age values and age thresholds representing time instead of cycles. By tracking an age value for each pending process and scheduling pending processes having an age value above an age threshold, the scheduler may avoid starvation.

The following example is described with respect to FIG. 2. In this example, a processor, such as the CPU 102 described with respect to FIG. 1, performs techniques to schedule single-threaded pending processes. The processor in this example may be a multi-threaded processor including a single core. The processor may begin by determining a parallelism value for each pending process of a set of pending processes based on ILP or MLP for the respective pending process. For example, the parallelism values may be indicated by counters associated with the pending processes. The processor may then sort each pending process based on the respective process' parallelism value. For example, the sorted processes may have parallelism values 6, 5, 4, 3, 2, and 1 for pending processes P4, P6, P5, P3, P2, and P1, respectively.

The processor may then determine, from the set of pending processes, a set of scheduled processes for the processor based on a parallelism threshold associated with the processor, a process threshold associated with the processor, and the sorting. For instance, the process threshold may be based on a thread capability of the processor, such as four in this example. The parallelism threshold may be based on an issue capability of the processor, such as eight in this example. The set of scheduled processes may be determined by adding pending processes to the set of scheduled processes unless a quantity of scheduled processes is equal to the process threshold, and removing pending processes from the set of pending processes once the respective pending process is added to the set of scheduled processes.

To determine the set of scheduled processes, the processor may first add selected processes of the set of pending processes having a largest parallelism value. For instance, the processor may add P4 to the set of scheduled processes and remove P4 from the set of pending processes. The processor may then calculate the difference between the parallelism threshold and the largest parallelism value associated with the selected process. In this example, P4 has a parallelism value of six, and the processor has a parallelism threshold of eight. Therefore, the difference is two. The processor may then add a process having the largest parallelism value that is less than the difference to the set of scheduled processes. Because the difference is two and P2 has a parallelism value of 2, the processor may then add P2 to the set of scheduled processes.

Additionally, or alternatively, the processor may first add selected processes of the set of pending processes having a smallest parallelism value. For instance, the processor may add P1 to the set of scheduled processes and remove P1 from the set of pending processes. The processor may then calculate the difference between the parallelism threshold and the smallest parallelism value associated with the selected process. In this example, P1 has a parallelism value of one, and the processor has a parallelism threshold of eight. Therefore, the difference is seven. The processor may then add the process having the smallest parallelism value that is less than the difference to the set of scheduled processes. Because the difference is seven and P2 has a parallelism value of two, the processor may then add P2 to the set of scheduled processes.

The processor may then recalculate the difference between the parallelism threshold and the sum of the smallest parallelism value and the next smallest parallelism value. The difference is five. The processor may then add a third selected process having a largest parallelism value that is less than the updated difference to the set of scheduled processes, in response to no combination of unscheduled processes having a combined parallelism value that is smaller than the updated difference. For instance, the processor may add P6 to the set of scheduled processes. After adding P6 to the set of scheduled processes, the processor has a remaining parallelism threshold of zero. The processor therefore stops adding processes to the set of scheduled processes.

Figure 3:
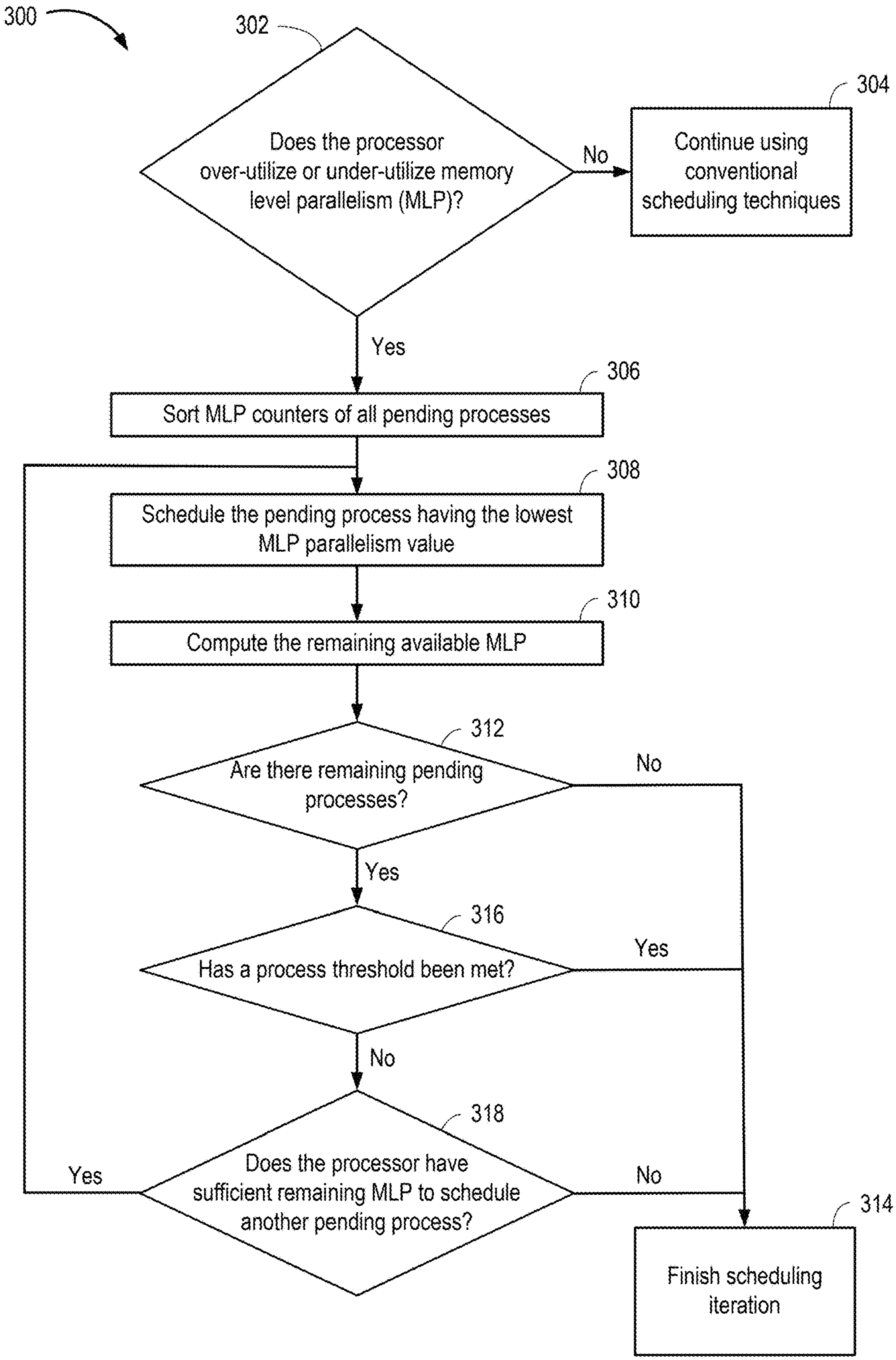
FIG. 3 is a flow diagram illustrating a scheduling process for a single-threaded multi-core processor, in accordance with various aspects of the present disclosure.

FIG. 3 is a flow diagram illustrating a scheduling process 300 for a single-threaded multi-core processor, in accordance with various aspects of the present disclosure. In the example illustrated with respect to FIG. 3, a chip includes a multi-core processor, each core of the processor being single-threaded. The processor also includes a process scheduler that assigns pending processes to each core. Because each of the cores shares resources, the scheduler may schedule processes based on anticipated resource usage of each process. For example, the cores may share level two (L2) and level three (L3) cache memory. It may be preferable to schedule a mix of high MLP and low MLP processes so that the shared L2 and L3 memory is not over-utilized or under-utilized. For instance, if a processor includes four single-threaded cores on a chip and the available MLP at L2 and L3 is eight, then it may be preferable to schedule four processes such that the combined MLP of the scheduled processes is equal to eight. Scheduling four high MLP processes may cause a system resource shortage, while scheduling four low MLP processes may cause system resources to be under-utilized.

The processor's operating system may include hardware performance counters stored in a process control block. The counters may track the MLP for each process as parallelism values. For example, a memory intensive process may have a counter storing a high MLP parallelism value. The counters may implement sliding window techniques to indicate the MLP of a process for a last n scheduling quanta, where n is a positive number. If the operating system makes a scheduling decision, the operating system may implement the process 300 to schedule processes based on MLP. In the example illustrated with respect to FIG. 3, a four-core processor includes cores C1, C2, C3, and C4. Each core has a private level one (L1) cache, but shares an L2 cache with the other three cores. L2 is the last level cache.

At block 302, the scheduler determines if the processor over-utilizes or under-utilizes MLP. For example, the processor may execute multiple processes simultaneously, each process not being memory intensive. Because each process is not memory intensive, the scheduler may determine that the processor is under-utilizing MLP. If the scheduler determines that the processor is not over-utilizing or under-utilizing MLP, then the scheduler may continue to implement conventional scheduling techniques, at block 304. If the scheduler determines that the processor is over-utilizing or under-utilizing MLP, then the process 300 proceeds to block 306.

At block 306, the scheduler sorts the MLP counters of each pending process. For example, the set of pending processes may include six processes. Process P1 may have an MLP parallelism value of one, P2 may have an MLP parallelism value of two, P3 may have an MLP parallelism value of three, P4 may have an MLP parallelism value of six, P5 may have an MLP parallelism value of four, and P6 may have an MLP parallelism value of five. Therefore, the sorted MLP counters may have parallelism values 6, 5, 4, 3, 2, and 1 for processes P4, P6, P5, P3, P2, and P1, respectively.

At block 308, the scheduler schedules the pending process having the lowest MLP parallelism value. The scheduler then computes the remaining available MLP at block 310. The scheduler may then determine whether to schedule another pending process or to finish the scheduling iteration. For instance, at block 312, the scheduler determines if there are remaining pending processes. If there are no remaining pending processes, the scheduler finishes the scheduling iteration at block 314. If there are remaining pending processes, the scheduler determines if a process threshold has been met at block 316. The process threshold may be based on a core count of the processor. If the quantity of scheduled processes is equal to or greater than the process threshold, the process threshold is met, and the scheduler may finish the scheduling iteration at block 314. If the quantity of scheduled processes is less than the process threshold, the process threshold is not met, and the scheduler may continue to block 318.

At block 318, the scheduler determines if the processor has sufficient remaining MLP to schedule another pending process. If the processor does not have sufficient remaining MLP to schedule another pending process, the scheduler may finish the scheduling iteration at block 314. For example, if the processor has a remaining MLP of four, but no pending processes have a parallelism value that is equal to or less than four, then the processor does not have sufficient remaining MLP to schedule another pending process. If the processor does have sufficient remaining MLP to schedule another pending process, the scheduler schedules the pending process having the lowest MLP parallelism value at block 308. The scheduler may then continue scheduling processes until the scheduler finishes the scheduling iteration at block 314.

In one example, a processor has four cores on one chip, cores C1, C2, C3, and C4. The processor supports eight outstanding misses at L2, allowing an MLP of eight before the processor becomes over-subscribed. The sorted MLP counters may have parallelism values 6, 5, 4, 3, 2, and 1 for pending processes P4, P6, P5, P3, P2, and P1, respectively. The scheduler may first schedule the pending process having the lowest parallelism value, P1. The scheduler may then compute the difference between the parallelism value of the scheduled processes and the L2 cache miss capability of the processor to determine that the processor has a remaining available MLP of seven. Next, the scheduler may schedule the pending process having the next lowest parallelism value, P2. The scheduler may then compute the difference between the parallelism value of the scheduled processes and the L2 cache miss capability of the processor to determine that the processor has a remaining available MLP of five.

In some implementations, the scheduler may continue to schedule processes having a lowest parallelism value until no pending processes remain unscheduled, all four cores are occupied, or no remaining pending processes have a parallelism value that is less than the difference between the parallelism value of the scheduled processes and the L2 cache miss capability of the processor. It is also contemplated that the scheduler may implement techniques to decrease the difference between the parallelism value of the scheduled processes and the L2 cache miss capability of the processor. For example, the scheduler may schedule P1 and P2. Instead of scheduling P3, the pending process with the lowest parallelism value, the scheduler may determine that the remaining available MLP (e.g., five) only allows for one more of the pending processes to be scheduled. Because the scheduler can only schedule one more of the pending processes, the scheduler may transition from scheduling processes with a lowest parallelism value to scheduling processes with a highest parallelism value not exceeding the remaining available MLP. For instance, the scheduler may schedule P6, the remaining pending process with the highest parallelism value that does not exceed the available MLP.

It is also contemplated that the scheduler may prioritize pending processes having a highest parallelism value that does not exceed the available MLP. For example, the sorted MLP counters may have parallelism values 6, 5, 4, 3, 2, and 1 for pending processes P4, P6, P5, P3, P2, and P1, respectively. The scheduler may first schedule the pending process having the highest parallelism value, P4. After computing the available MLP as two, the scheduler may schedule P2, the pending processes having the highest parallelism value that does not exceed the available MLP. The scheduler then has no remaining available MLP to schedule more pending processes.

In a first implementation discussed with respect to FIG. 3, the scheduler is able to fully utilize the available MLP by scheduling the two processes having the highest parallelism value not exceeding the available MLP. In a second implementation, the scheduler is able to fully utilize the available MLP by scheduling the two processes having the lowest parallelism value and, once the scheduler can only schedule one more process, scheduling the process having the highest parallelism value not exceeding the available MLP. The second implementation utilizes one more core than the first implementation while both implementations fully utilize available MLP.

The scheduler may additionally track an age value for each pending process and schedule pending processes having an age value above an age threshold. For example, the scheduler may track the amount of cycles that each pending process has remained unscheduled. The age threshold in this example may be n, where n can be any positive number. If a process has been pending for n cycles, then the scheduler may schedule the process before scheduling other pending processes. Additionally, or alternatively, if a process has been pending for n cycles, then the scheduler may schedule the process in the next scheduling quanta. Other implementations of age values and age thresholds are contemplated, such as age values and age thresholds representing time instead of cycles.

In some implementations, the scheduler may schedule pending processes having MLP parallelism values exceeding the available MLP. For example, a sorted set of MLP counters may have parallelism values 6, 5, 4, 3, 2, and 1 for pending processes P4, P6, P5, P3, P2, and P1, respectively. The scheduler may assign P1 to C1, P2 to C2, and P6 to C3. After scheduling P1, P2, and P6, the scheduler has reached the available MLP of eight, but C4 is at risk of remaining idle. The scheduler may then over-subscribe the processor instead of allowing C4 to remain idle. For instance, once no pending processes have parallelism values equal to or less than the available MLP, the scheduler may transition to scheduling pending process having a lowest MLP until a core threshold is satisfied. The core threshold may be equal to the quantity of cores included in the processor.

The following example is described with respect to FIG. 3. In this example, a processor, such as the CPU 102 described with respect to FIG. 1, performs techniques to schedule single-threaded pending processes. The processor in this example may be a multi-core processor including a set of cores, each supporting a single thread. The processor may begin by determining a parallelism value for each pending process of a set of pending processes based on ILP or MLP for the respective pending process. For example, the parallelism values may be indicated by counters associated with the pending processes. The processor may then sort each pending process based on the respective process' parallelism value. For example, the sorted processes may have MLP parallelism values 6, 5, 4, 3, 2, and 1 for pending processes P4, P6, P5, P3, P2, and P1, respectively.

The processor may then determine, from the set of pending processes, a set of scheduled processes for the processor based on a parallelism threshold associated with the processor, a process threshold associated with the processor, and the sorting. For instance, the process threshold may be based on a core capability of the processor, such as four in this example. The parallelism threshold may be based on a memory miss capability of the processor, such as eight in this example. The set of scheduled processes may be determined by adding pending processes to the set of scheduled processes unless a quantity of scheduled processes is equal to the process threshold, and removing pending processes from the set of pending processes once the respective pending process is added to the set of scheduled processes.

To determine the set of scheduled processes, the processor may first add selected processes from the set of pending processes having a largest parallelism value. For instance, the processor may add P4 to the set of scheduled processes and remove P4 from the set of pending processes. The processor may then calculate the difference between the parallelism threshold and the largest parallelism value associated with the selected process. In this example, P4 has a parallelism value of six, and the processor has a parallelism threshold of eight. Therefore, the difference is two. The processor may then add the process having the largest parallelism value that is less than the difference to the set of scheduled processes. Because the difference is two and P2 has a parallelism value of two, the processor may add P2 to the set of scheduled processes.

Additionally, or alternatively, the processor may first add selected processes of the set of pending processes having a smallest parallelism value. For instance, the processor may add P1 to the set of scheduled processes and remove P1 from the set of pending processes. The processor may then calculate the difference between the parallelism threshold and the smallest parallelism value associated with the selected process. In this example, P1 has a parallelism value of one, and the processor has a parallelism threshold of eight. Therefore, the difference is seven. The processor may then add the process having the smallest parallelism value that is less than the difference to the set of scheduled processes. Because the difference is seven and P2 has a parallelism value of two, the processor may then add P2 to the set of scheduled processes.

The processor may then recalculate the difference between the parallelism threshold and the sum of the smallest parallelism value and the next smallest parallelism value, resulting in a difference of five. The processor may then add a third process having a largest parallelism value that is less than the updated difference to the set of scheduled processes, in response to no combination of unscheduled processes having a combined parallelism value that is smaller than the updated difference. For instance, the processor may add P6 to the set of scheduled processes. After adding P6 to the set of scheduled processes, the processor has a remaining parallelism threshold of zero. The processor may therefore stop adding processes to the set of scheduled processes.

If, as in this example, the parallelism values are based on MLP, the processor may continue adding selected processes even after the parallelism threshold is satisfied once no more pending processes may be scheduled without the difference falling below zero. For instance, the processor may add, to each core not assigned a scheduled process, a smallest unassigned pending process associated with a smallest parallelism value. The processor may continue scheduling processes having a smallest parallelism value until the process threshold is satisfied. For example, the processor may continue scheduling processes until each core has at least one scheduled process.

Figure 4:
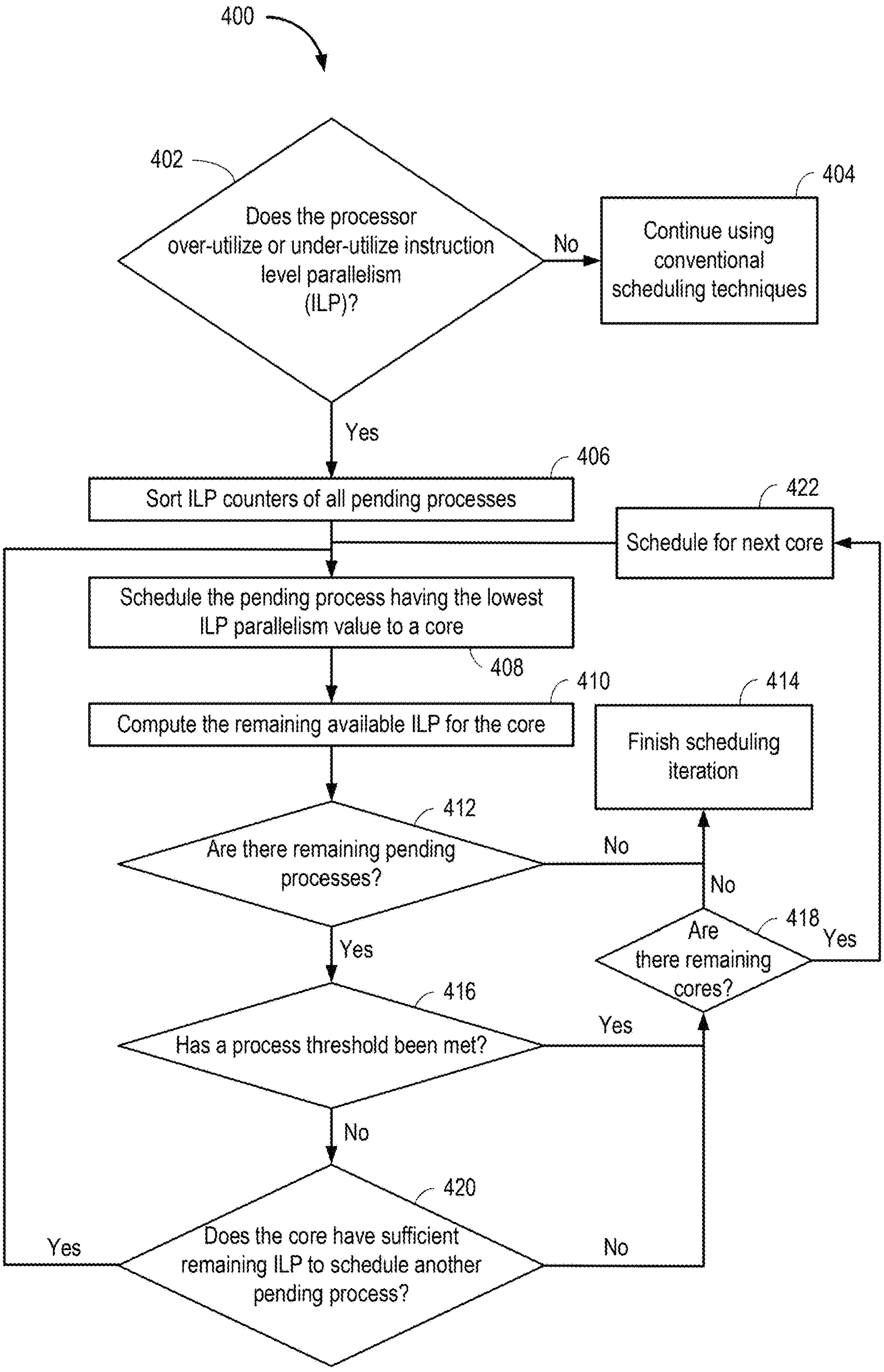
FIG. 4 is a flow diagram illustrating a scheduling process for a multi-threaded multi-core processor, in accordance with various aspects of the present disclosure.

FIG. 4 is a flow diagram illustrating a scheduling process 400 for a multi-threaded multi-core processor, in accordance with various aspects of the present disclosure. Although the example illustrated and discussed with respect to FIG. 4 includes techniques to schedule processes based on ILP, the same techniques may be used to schedule processes based on MLP. In the example illustrated with respect to FIG. 4, a chip includes a multi-core processor, each core of the processor supporting multiple threads. The processor also includes a process scheduler that assigns pending processes to each core. Because each of the cores shares resources and each of the threads shares resources, the scheduler may schedule processes based on anticipated resource usage of each process. For instance, scheduling only high ILP processes may cause a system resource shortage, while scheduling only low ILP processes may cause system resources to be under-utilized. Therefore, the scheduler may schedule a mix of high ILP and low ILP processes.

The processor's operating system may include hardware performance counters stored in a process control block. The counters may track the ILP for each process as parallelism values. The counters may also implement sliding window techniques to indicate the ILP of a process for a last n scheduling quanta, where n is a positive number. If the operating system makes a scheduling decision, the operating system may implement the process 400 to schedule processes based on ILP. In the example illustrated with respect to FIG. 4, a four-core processor includes cores C1, C2, C3, and C4.

At block 402, the scheduler determines if the processor over-utilizes or under-utilizes ILP. For example, the processor may execute multiple processes simultaneously and determine that the processor is under-utilizing ILP. If the scheduler determines that the processor is not over-utilizing or under-utilizing ILP, then the scheduler may continue using conventional scheduling techniques, at block 404. If the scheduler determines that the processor is over-utilizing or under-utilizing ILP, then the process 400 proceeds to block 406.

At block 406, the scheduler sorts the ILP counters of each pending process. For example, the set of pending processes may include six processes. Process P1 may have an ILP parallelism value of one, P2 may have an ILP parallelism value of two, P3 may have an ILP parallelism value of three, P4 may have an ILP parallelism value of six, P5 may have an ILP parallelism value of four, and P6 may have an ILP parallelism value of five. Therefore, the sorted ILP counters may have parallelism values 6, 5, 4, 3, 2, and 1 for processes P4, P6, P5, P3, P2, and P1, respectively.

At block 408, the scheduler schedules the pending process having the lowest ILP parallelism value to a core. For example, the processor may schedule a pending process having the lowest ILP parallelism value to core C1. The scheduler then computes the remaining available ILP for the core at block 410. At block 412, the scheduler determines if there are remaining pending processes. If there are no remaining pending processes, the scheduler finishes the scheduling iteration at block 414. If there are remaining pending processes, the scheduler determines if a process threshold has been met at block 416. The process threshold may be based on a thread capability of the core. If the quantity of scheduled processes is equal to or greater than the process threshold, the process threshold is met, and the scheduler may continue to block 418. If the quantity of scheduled processes is less than the process threshold, the process threshold is not met, and the scheduler may continue to block 420.

At block 420, the scheduler determines if the core has sufficient remaining ILP to schedule another pending process. If the core does not have sufficient remaining ILP to schedule another pending process, the scheduler may continue to block 418. For example, if the core has a remaining ILP of four, but no pending processes have a parallelism value that is equal to or less than four, then the core does not have sufficient remaining ILP to schedule another pending process. If the core does have sufficient remaining ILP to schedule another pending process, the scheduler schedules the pending process having the lowest ILP parallelism value to the core at block 408.

At block 418, the scheduler determines if there are remaining cores. For example, if the scheduler has only scheduled processes for core C1, then cores C2, C3, and C4 are remaining cores. If the scheduler has scheduled processes for each of the four cores, there are no remaining cores. If there are no remaining cores, the scheduler finishes the scheduling iteration at block 414. If there are remaining cores, the scheduler schedules for the next core at block 422. For instance, the scheduler may stop scheduling processes to core C1 and start scheduling processes for core C2. The scheduler may then schedule the pending process having the lowest ILP parallelism value to core C2 at block 408. The scheduler may then continue scheduling processes until the scheduler finishes the scheduling iteration at block 414.

In one example, each core of a four-core processor is eight-issue and can execute up to four threads simultaneously. The four cores, C1, C2, C3, and C4, may therefore collectively execute up to sixteen threads. The sorted ILP counters may have parallelism values 6, 5, 4, 3, 2, and 1 for pending processes P4, P6, P5, P3, P2, and P1, respectively. The scheduler may first schedule the pending process having the lowest parallelism value, P1, to C1. The scheduler may then compute the difference between the parallelism value of the scheduled processes and the issue capability of the core to determine that C1 has a remaining available ILP of seven. Next, the scheduler may schedule the pending process having the next lowest parallelism value, P2, to C1. The scheduler may then compute the difference between the parallelism value of the scheduled processes and the issue capability of the core to determine that C1 has a remaining available ILP of five. Because C1 only has sufficient ILP for one more of the pending processes, the scheduler may then transition to scheduling the pending process having the highest parallelism value not exceeding the remaining available ILP, P6.

Once P1, P2, and P6 are scheduled to C1, C1 has no remaining available ILP. The scheduler may therefore begin scheduling processes having the lowest parallelism value to the second core, C2. For instance, the scheduler may schedule P3 to C2. After computing the available ILP of C2 to be five, the scheduler may then schedule P5 to C2. The scheduler may then continue scheduling processes until no pending processes remain unscheduled, the process threshold for each core is met, or each core has insufficient remaining ILP to schedule additional processes.

The scheduler may additionally track an age value for each pending process and schedule pending processes having an age value above an age threshold. For example, the scheduler may track the amount of cycles that each pending process has remained unscheduled. The age threshold in this example may be n, where n can be any positive number. If a process has been pending for n cycles, then the scheduler may schedule the process before scheduling other pending processes. Additionally, or alternatively, if a process has been pending for n cycles, then the scheduler may schedule the process in the next scheduling quanta. Other implementations of age values and age thresholds are contemplated, such as age values and age thresholds representing time instead of cycles.

The techniques illustrated and described with respect to blocks 408-412 are an example, and the scheduler may implement one or more of the techniques discussed with respect to FIG. 2 and FIG. 3 to schedule pending processes to each core. Additionally, the set of pending processes may be different than those described. For example, the scheduler may sort sixteen pending processes, P1 to P16. The scheduler may then schedule the pending processes using the described techniques.

The following example is described with respect to FIG. 4. In this example, a processor, such as the CPU 102 described with respect to FIG. 1, performs techniques to schedule single-threaded pending processes. The processor in this example may be a multi-core processor including a set of cores, where each core of the set of cores supports multiple threads. The processor may begin by determining a parallelism value for each pending process of a set of pending processes based on ILP or MLP for the respective pending process. For example, the parallelism values may be indicated by counters associated with the pending processes. The processor may then sort each pending process based on the respective process' parallelism value. For example, the sorted processes may have MLP parallelism values 6, 5, 4, 3, 2, and 1 for pending processes P4, P6, P5, P3, P2, and P1, respectively.

The processor may then determine a set of scheduled processes by scheduling processes for each core of the set of cores. For instance, the processor may determine, from the set of pending processes, a set of scheduled processes based on a parallelism threshold associated with the respective core, a process threshold associated with the respective core, and the sorting. The process threshold may be based on a thread capability of the core, such as four in this example. The parallelism threshold may be based on a memory miss capability of the processor, such as eight in this example. The set of scheduled processes may be determined by adding pending processes to the set of scheduled processes unless a quantity of scheduled processes is equal to the process threshold, and removing pending processes from the set of pending processes once the respective pending process is added to the set of scheduled processes.

To determine the set of scheduled processes, the processor may first add selected processes of the set of pending processes having a largest parallelism value. For instance, the processor may add P4 to the set of scheduled processes and remove P4 from the set of pending processes. The processor may then calculate the difference between the parallelism threshold and the largest parallelism value associated with the selected process. In this example, P4 has a parallelism value of six, and the processor has a parallelism threshold of eight. Therefore, the difference is two. The processor may then add the process having the largest parallelism value that is less than the difference to the set of scheduled processes. Because the difference is two and P2 has a parallelism value of two, the processor may then add P2 to the set of scheduled processes.

Additionally, or alternatively, the processor may first add selected processes of the set of pending processes having a smallest parallelism value. For instance, the processor may add P1 to the set of scheduled processes and remove P1 from the set of pending processes. The processor may then calculate the difference between the parallelism threshold and the smallest parallelism value associated with the selected process. In this example, P1 has a parallelism value of one, and the processor has a parallelism threshold of eight. Therefore, the difference is seven. The processor may then add the process having the smallest parallelism value that is less than the difference to the set of scheduled processes. Because the difference is seven and P2 has a parallelism value of two, the processor may then add P2 to the set of scheduled processes.

The processor may then recalculate the difference between the parallelism threshold and the sum of the smallest parallelism value and the next smallest parallelism value to obtain a difference of five. The processor may then add a third process having a largest parallelism value that is less than the updated difference to the set of scheduled processes, in response to no combination of unscheduled processes having a combined parallelism value that is smaller than the updated difference. For instance, the processor may add P6 to the set of scheduled processes. After adding P6 to the set of scheduled processes, the processor has a remaining parallelism threshold of zero. The processor may therefore stop adding processes to the set of scheduled processes.

The selected process, parallelism value, and difference may be core-specific, such that the processor is able to repeat the discussed techniques for each core. For instance, the processor may assign a selected process to a first core, C1, and compute a difference for C1 based on the selected process and a parallelism threshold associated with the core. After C1 has reached a process threshold or the processor cannot assign more processes to C1 without the difference for C1 falling below zero, the processor may assign selected processes to a next core, C2. The processor may continue assigning processes to cores until all cores have satisfied a process threshold, no pending processes remain, or the core-specific difference for each core is such that no more pending processes may be scheduled without the core-specific difference falling below zero. As discussed, the selected process, parallelism value, and difference may not be core-specific. For example, if the parallelism threshold is based on a memory miss capability of the processor, each of the cores may share a parallelism threshold.

If the parallelism values are based on MLP, the processor may continue adding selected processes to cores even after the parallelism threshold is satisfied once no more pending processes may be scheduled without the difference falling below zero. For instance, the processor may add, to each core not assigned a scheduled process, a smallest unassigned pending process associated with a smallest parallelism value. The processor may continue scheduling processes having a smallest parallelism value until each core has at least one scheduled process.

Figure 5:
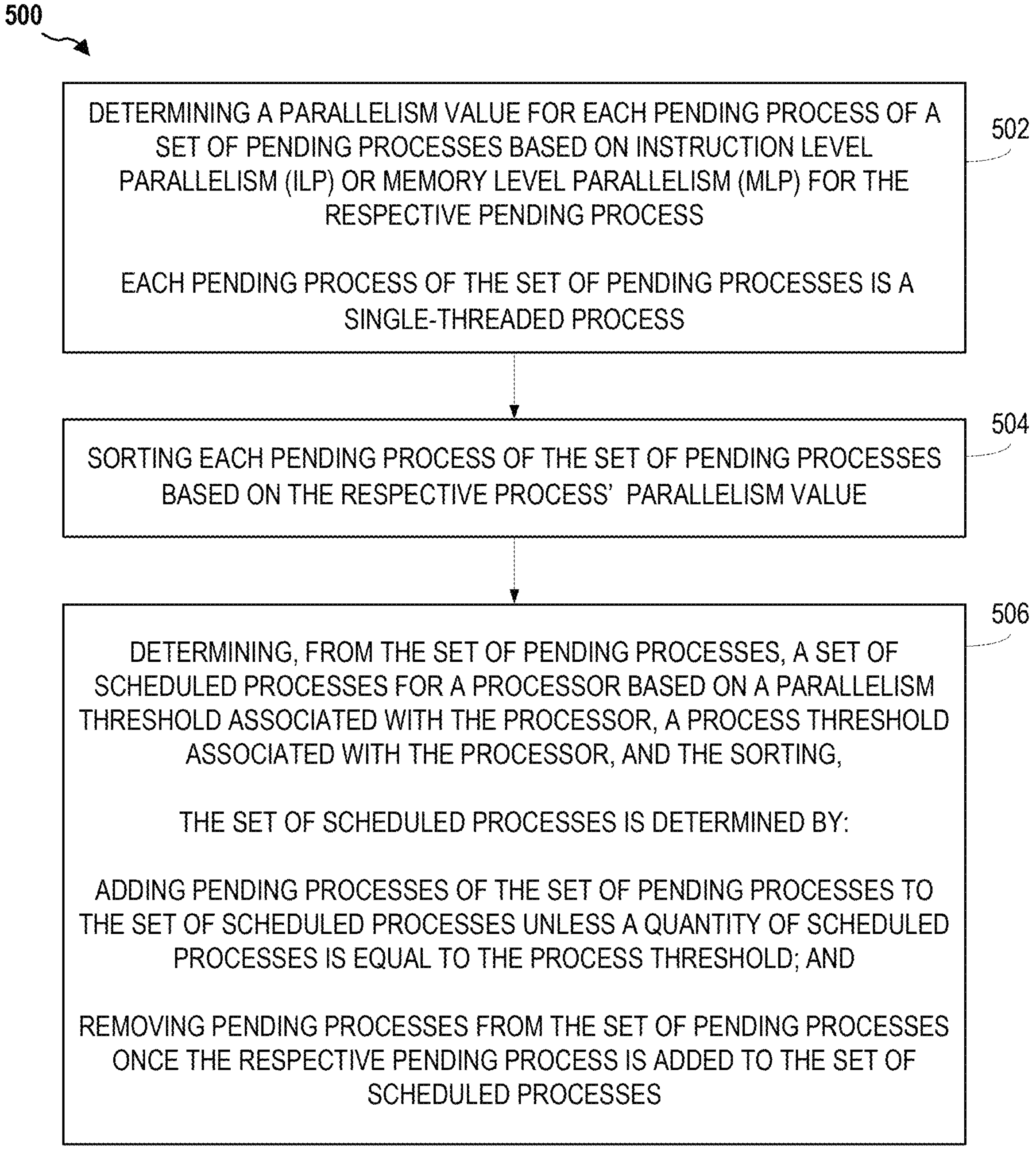
FIG. 5 is a flow diagram illustrating an example process performed, for example, by a process scheduler, in accordance with various aspects of the present disclosure.

FIG. 5 is a flow diagram illustrating an example process performed, for example, by a process scheduler, in accordance with various aspects of the present disclosure. The process 500 may be performed by one or more processors such as the CPU 102, GPU 104 and/or other processing unit.

In some aspects, the process 500 may include determining a parallelism value for each pending process of a set of pending processes based on ILP or MLP for the respective pending process, where each pending process is a single-threaded process (block 502). The parallelism values may be stored in performance counters that indicate the parallelism value for each pending process via a sliding memory window. The process 500 may also include sorting each pending process of the set of pending processes based on the respective process' parallelism value (block 504). For example, the process 500 may sort each of the pending processes in an order of smallest to largest based on an MLP parallelism value associated with the respective process.

The process 500 may further include determining, from the set of pending processes, a set of scheduled processes for a processor based on a parallelism threshold associated with the processor, a process threshold associated with the processor, and the sorting (block 506). The set of scheduled processes is determined by adding pending processes of the set of pending processes to the set of scheduled processes unless a quantity of scheduled processes is equal to the process threshold; and removing pending processes from the set of pending processes once the respective pending process is added to the set of scheduled processes. In some implementations, the process 500 may stop adding pending processes to the set of scheduled processes once a parallelism threshold is satisfied.

Figure 6:
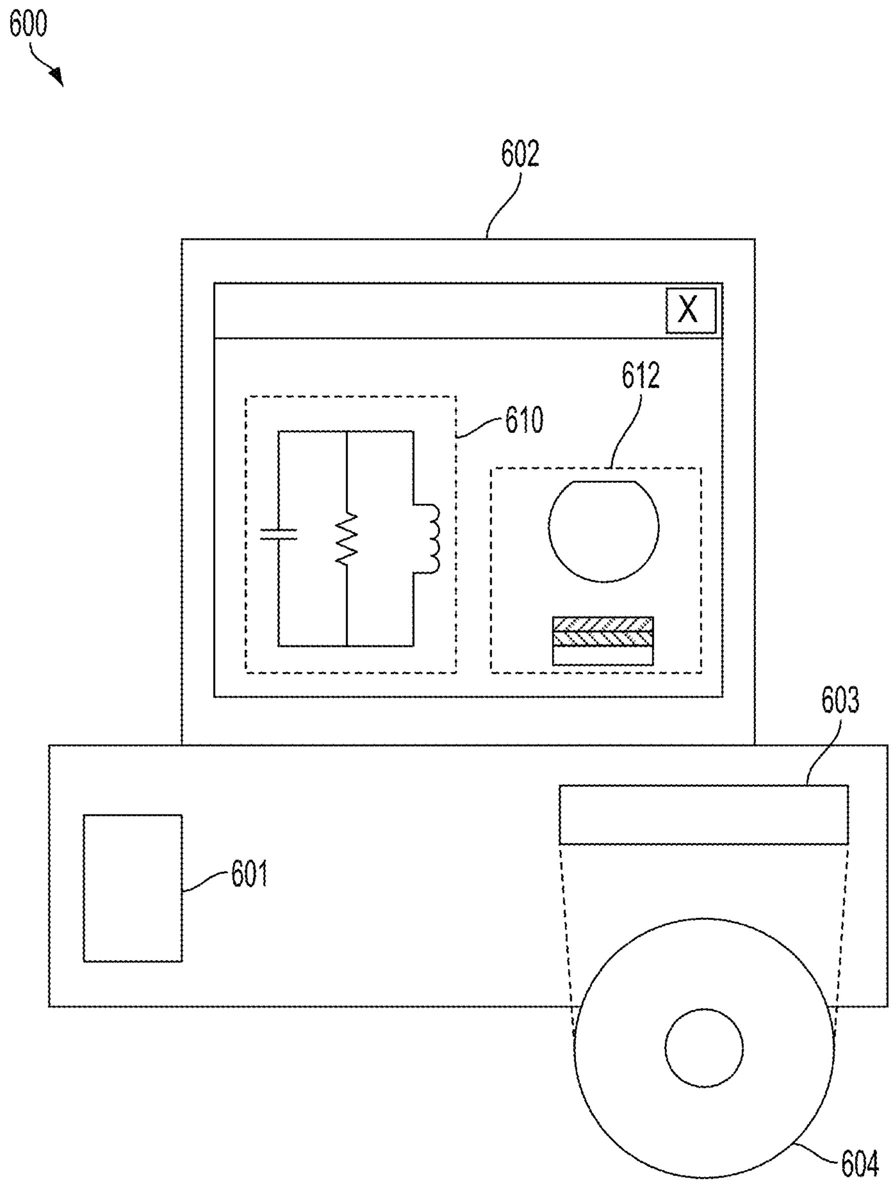
FIG. 6 is a block diagram illustrating a design workstation used for circuit, layout, and logic design of components, in accordance with various aspects of the present disclosure.

FIG. 6 is a block diagram illustrating a design workstation 600 used for circuit, layout, and logic design of a semiconductor component, such as the process scheduler, disclosed above. The design workstation 600 includes a hard disk 601 containing operating system software, support files, and design software such as Cadence or OrCAD. The design workstation 600 also includes a display 602 to facilitate design of a circuit 610 or a semiconductor component 612, such as the disclosed process scheduler. A storage medium 604 is provided for tangibly storing the design of the circuit 610 or the semiconductor component 612 (e.g., the disclosed process scheduler). The design of the circuit 610 or the semiconductor component 612 may be stored on the storage medium 604 in a file format such as GDSII or GERBER. The storage medium 604 may be a CD-ROM, DVD, hard disk, flash memory, or other appropriate device. Furthermore, the design workstation 600 includes a drive apparatus 603 for accepting input from or writing output to the storage medium 604.

Data recorded on the storage medium 604 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 604 facilitates the design of the circuit 610 or the semiconductor component 612 by decreasing the number of processes for designing semiconductor wafers.

EXAMPLE ASPECTS

Aspect 1: A method, comprising: determining a parallelism value for each pending process of a set of pending processes based on instruction level parallelism (ILP) or memory level parallelism (MLP) for the respective pending process, each pending process of the set of pending processes being a single-threaded process; sorting each pending process of the set of pending processes based on the respective process' parallelism value; and determining, from the set of pending processes, a set of scheduled processes for a processor based on a parallelism threshold associated with the processor, a process threshold associated with the processor, and the sorting, the set of scheduled processes determined by: adding pending processes of the set of pending processes to the set of scheduled processes unless a quantity of scheduled processes is equal to the process threshold; and removing pending processes from the set of pending processes once the respective pending process is added to the set of scheduled processes.

Aspect 2: The method of Aspect 1, further comprising determining the set of scheduled processes by tracking an age value for each pending process of the set of pending processes and adding, to the set of scheduled processes, pending processes associated with age values above an age threshold.

Aspect 3: The method of Aspect 1 or 2, in which the adding pending processes further comprises: adding to the set of scheduled processes a selected process, of the set of pending processes, having a largest parallelism value; calculating a difference between the parallelism threshold and the largest parallelism value associated with the selected process; and adding to the set of scheduled processes a pending process having the largest parallelism value that is less than the difference.

Aspect 4: The method of any of the Aspects 1-3, in which the processor is a multi-threaded processor including a single core, the process threshold is based on a thread capability of the processor.

Aspect 5: The method of any of the Aspects 1-4, in which the processor is a multi-core processor including a set of cores, each core of the set of cores supporting a single thread, the process threshold based on a core count of the processor.

Aspect 6: The method of any of the Aspects 1-5, in which: the parallelism value for each pending process of the set of pending processes is based on MLP, the parallelism threshold is based on a memory miss capability of the processor; and the adding pending processes further comprises adding, to each core of the set of cores not assigned one of the scheduled processes of the set of scheduled processes, a largest unassigned pending process associated with the largest parallelism value, in response to the parallelism threshold having been met.

Aspect 7: The method of any of the Aspects 1-3, in which: the processor includes a set of cores, each core supporting multiple threads; the parallelism value for each pending process of the set of pending processes are based on ILP; and the set of scheduled processes is further determined by, for each core of the set of cores: adding to the set of scheduled processes a core-specific selected process, of the set of pending processes, having a core-specific largest parallelism value; calculating a core-specific difference between the parallelism threshold and the core-specific largest parallelism value associated with the selected process; and adding to the set of scheduled processes a core-specific pending process having the core-specific largest parallelism value that is less than the core-specific difference.

Aspect 8: The method of any of the Aspects 1-3, in which: the processor includes a set of cores, each core supporting multiple threads; the parallelism value for each pending process of the set of pending processes is based on MLP; and the set of scheduled processes is further determined by, for each core of the set of cores: adding to the set of scheduled processes a core-specific selected process, of the set of pending processes, having a core-specific largest parallelism value; calculating a core-specific difference between the parallelism threshold and the core-specific largest parallelism value associated with the selected process; and adding to the set of scheduled processes a core-specific pending process having the core-specific largest parallelism value that is less than the core-specific difference; and adding, to each core of the set of cores not assigned one of the scheduled processes of the set of scheduled processes, a smallest unassigned pending processes associated with a smallest parallelism value, in response to the parallelism threshold having been met.

Aspect 9: The method of Aspect 1 or 2, in which the adding pending processes further comprises: adding, to the set of scheduled processes, a first selected process of the set of pending processes having a smallest parallelism value; calculating a difference between the parallelism threshold and the parallelism value associated with the first selected process; adding, to the set of scheduled processes, a second selected process of the set of pending processes having a next smallest parallelism value; calculating an updated difference between the parallelism threshold and a sum of the smallest parallelism value and the next smallest parallelism value; and adding a third selected process having a largest parallelism value that is less than the updated difference to the set of scheduled processes, in response to no combination of unscheduled processes having a combined parallelism value that is smaller than the updated difference.

Aspect 10: The method of Aspect 1, 2, or 9, in which the processor is a multi-threaded processor including a single core, the process threshold based on a thread capability of the processor.

Aspect 11: The method of Aspect 1, 2, or 9, in which the processor is a multi-core processor including a set of cores, each core of the set of cores supporting a single thread, the process threshold based on a core count of the processor.

Aspect 12: The method of Aspect 1, 2, 9, or 11, in which: the parallelism value for each pending process of the set of pending processes is based on MLP, the parallelism threshold is based on a memory miss capability of the processor; and the adding pending processes further comprises adding, to each core of the set of cores not assigned one of the scheduled processes of the set of scheduled processes, a smallest unassigned pending process associated with the smallest parallelism value, in response to the parallelism threshold having been met.

Aspect 13: The method of Aspect 1, 2, or 9, in which: the processor includes a set of cores, each core supporting multiple threads; the parallelism value for each pending process of the set of pending processes is based on ILP; and the set of scheduled processes is further determined by, for each core of the set of cores: adding, to the set of scheduled processes, a first core-specific selected process of the set of pending processes having a core-specific smallest parallelism value; calculating a core-specific difference between the parallelism threshold and the core-specific smallest parallelism value associated with the first core-specific selected process; adding, to the set of scheduled processes, a second core-specific selected process of the set of pending processes having a next core-specific smallest parallelism value; calculating an updated core-specific difference between the parallelism threshold and a core-specific sum of the core-specific smallest parallelism value and the next core-specific smallest parallelism value; and adding a third core-specific selected process having a core-specific largest parallelism value that is less than the updated core-specific difference to the set of scheduled processes, in response to no combination of unscheduled processes having a core-specific combined parallelism value that is smaller than the updated core-specific difference.

Aspect 14: The method of Aspect 1, 2, or 9, in which: the processor includes a set of cores, each core supporting multiple threads; the parallelism value for each pending process of the set of pending processes is based on MLP; and the set of scheduled processes is further determined by, for each core of the set of cores: adding, to the set of scheduled processes, a first core-specific selected process of the set of pending processes having a core-specific smallest parallelism value; calculating a core-specific difference between the parallelism threshold and the core-specific smallest parallelism value associated with the first core-specific selected process; adding, to the set of scheduled processes, a second core-specific selected process of the set of pending processes having a next core-specific smallest parallelism value; calculating an updated core-specific difference between the parallelism threshold and a core-specific sum of the core-specific smallest parallelism value and the next core-specific smallest parallelism value; adding a third core-specific selected process having a core-specific largest parallelism value that is less than the updated core-specific difference to the set of scheduled processes, in response to no combination of unscheduled processes having a core-specific combined parallelism value that is smaller than the updated core-specific difference; and the adding pending processes further comprises adding, to each core of the set of cores not assigned one of the scheduled processes of the set of scheduled processes, a smallest unassigned pending processes associated with the smallest parallelism value, in response to the parallelism threshold having been met.

Aspect 15: An apparatus, comprising: at least one memory; and at least one processor coupled to the at least one memory, the at least one processor configured to: determine a parallelism value for each pending process of a set of pending processes based on instruction level parallelism (ILP) or memory level parallelism (MLP) for the respective pending process, each pending process of the set of pending processes being a single-threaded process; sort each pending process of the set of pending processes based on the respective process' parallelism value; and determine, from the set of pending processes, a set of scheduled processes for a processor based on a parallelism threshold associated with the processor, a process threshold associated with the processor, and the sorting, the set of scheduled processes determined by: adding pending processes of the set of pending processes to the set of scheduled processes unless a quantity of scheduled processes is equal to the process threshold; and removing pending processes from the set of pending processes once the respective pending process is added to the set of scheduled processes.

Aspect 16: The apparatus of Aspect 15, in which the apparatus further comprises performance counters configured to indicate the parallelism value for each pending process of the set of pending processes via a sliding memory window, the performance counters stored in a process control block.

Aspect 17: The apparatus of Aspect 15 or 16, in which the at least one processor is further configured to determine the set of scheduled processes by tracking an age value for each pending process of the set of pending processes and adding, to the set of scheduled processes, pending processes associated with age values above an age threshold.

Aspect 18: The apparatus of any of the Aspects 15-17, in which the at least one processor is further configured to: add to the set of scheduled processes a selected process, of the set of pending processes, having a largest parallelism value; calculate a difference between the parallelism threshold and the largest parallelism value associated with the selected process; and add to the set of scheduled processes a pending process having the largest parallelism value that is less than the difference.

Aspect 19: The apparatus of any of the Aspects 15-17, in which the at least one processor is further configured to: add, to the set of scheduled processes, a first selected process of the set of pending processes having a smallest parallelism value; calculate a difference between the parallelism threshold and the parallelism value associated with the first selected process; add, to the set of scheduled processes, a second selected process of the set of pending processes having a next smallest parallelism value; calculate an updated difference between the parallelism threshold and a sum of the smallest parallelism value and the next smallest parallelism value; and add a third selected process having a largest parallelism value that is less than the updated difference to the set of scheduled processes, in response to no combination of unscheduled processes having a combined parallelism value that is smaller than the updated difference.

The various operations of methods described above may be performed by any suitable means capable of performing the corresponding functions. The means may include various hardware and software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Aspects of the present disclosure may specify both hardware and software components. For example, some implementations may specify hardware support via performance counters and software support via operating system scheduler improvement. Further, the steps of a method or algorithm described in connection with the present disclosure may be embodied directly in a hardware module and software module executed by a processor. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware and software/firmware. If implemented in hardware with software, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware and software implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

In software implementations, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method, comprising:

determining a parallelism value for each pending process of a set of pending processes based on instruction level parallelism (ILP) or memory level parallelism (MLP) for the respective pending process, each pending process of the set of pending processes being a single-threaded process;

sorting each pending process of the set of pending processes based on the respective process' parallelism value; and determining, from the set of pending processes, a set of scheduled processes for a processor based on a parallelism threshold associated with the processor, a process threshold associated with the processor, and the sorting, the set of scheduled processes determined by:

adding pending processes of the set of pending processes to the set of scheduled processes unless a quantity of scheduled processes is equal to the process threshold; and removing pending processes from the set of pending processes once the respective pending process is added to the set of scheduled processes.

2. The method of claim 1, further comprising determining the set of scheduled processes by tracking an age value for each pending process of the set of pending processes and adding, to the set of scheduled processes, pending processes associated with age values above an age threshold.

3. The method of claim 1, in which the adding pending processes further comprises:

adding to the set of scheduled processes a selected process, of the set of pending processes, having a largest parallelism value;

calculating a difference between the parallelism threshold and the largest parallelism value associated with the selected process; and adding to the set of scheduled processes a pending process having the largest parallelism value that is less than the difference.

4. The method of claim 3, in which the processor is a multi-threaded processor including a single core, the process threshold is based on a thread capability of the processor.

5. The method of claim 3, in which the processor is a multi-core processor including a set of cores, each core of the set of cores supporting a single thread, the process threshold based on a core count of the processor.

6. The method of claim 5, in which:

the parallelism value for each pending process of the set of pending processes is based on MLP, the parallelism threshold is based on a memory miss capability of the processor; and the adding pending processes further comprises adding, to each core of the set of cores not assigned one of the scheduled processes of the set of scheduled processes, a largest unassigned pending process associated with the largest parallelism value, in response to the parallelism threshold having been met.

7. The method of claim 3, in which:

the processor includes a set of cores, each core supporting multiple threads;

the parallelism value for each pending process of the set of pending processes are based on ILP; and the set of scheduled processes is further determined by, for each core of the set of cores:

adding to the set of scheduled processes a core-specific selected process, of the set of pending processes, having a core-specific largest parallelism value;

calculating a core-specific difference between the parallelism threshold and the core-specific largest parallelism value associated with the selected process; and adding to the set of scheduled processes a core-specific pending process having the core-specific largest parallelism value that is less than the core-specific difference.

8. The method of claim 3, in which:

the processor includes a set of cores, each core supporting multiple threads;

the parallelism value for each pending process of the set of pending processes is based on MLP; and the set of scheduled processes is further determined by, for each core of the set of cores:

adding to the set of scheduled processes a core-specific selected process, of the set of pending processes, having a core-specific largest parallelism value;

calculating a core-specific difference between the parallelism threshold and the core-specific largest parallelism value associated with the selected process; and adding to the set of scheduled processes a core-specific pending process having the core-specific largest parallelism value that is less than the core-specific difference; and adding, to each core of the set of cores not assigned one of the scheduled processes of the set of scheduled processes, a smallest unassigned pending processes associated with a smallest parallelism value, in response to the parallelism threshold having been met.

9. The method of claim 1, in which the adding pending processes further comprises:

adding, to the set of scheduled processes, a first selected process of the set of pending processes having a smallest parallelism value;

calculating a difference between the parallelism threshold and the parallelism value associated with the first selected process;

adding, to the set of scheduled processes, a second selected process of the set of pending processes having a next smallest parallelism value;

calculating an updated difference between the parallelism threshold and a sum of the smallest parallelism value and the next smallest parallelism value; and adding a third selected process having a largest parallelism value that is less than the updated difference to the set of scheduled processes, in response to no combination of unscheduled processes having a combined parallelism value that is smaller than the updated difference.

10. The method of claim 9, in which the processor is a multi-threaded processor including a single core, the process threshold based on a thread capability of the processor.

11. The method of claim 9, in which the processor is a multi-core processor including a set of cores, each core of the set of cores supporting a single thread, the process threshold based on a core count of the processor.

12. The method of claim 11, in which:

the parallelism value for each pending process of the set of pending processes is based on MLP, the parallelism threshold is based on a memory miss capability of the processor; and the adding pending processes further comprises adding, to each core of the set of cores not assigned one of the scheduled processes of the set of scheduled processes, a smallest unassigned pending process associated with the smallest parallelism value, in response to the parallelism threshold having been met.

13. The method of claim 9, in which:

the processor includes a set of cores, each core supporting multiple threads;

the parallelism value for each pending process of the set of pending processes is based on ILP; and the set of scheduled processes is further determined by, for each core of the set of cores:

adding, to the set of scheduled processes, a first core-specific selected process of the set of pending processes having a core-specific smallest parallelism value;

calculating a core-specific difference between the parallelism threshold and the core-specific smallest parallelism value associated with the first core-specific selected process;

adding, to the set of scheduled processes, a second core-specific selected process of the set of pending processes having a next core-specific smallest parallelism value;

calculating an updated core-specific difference between the parallelism threshold and a core-specific sum of the core-specific smallest parallelism value and the next core-specific smallest parallelism value; and adding a third core-specific selected process having a core-specific largest parallelism value that is less than the updated core-specific difference to the set of scheduled processes, in response to no combination of unscheduled processes having a core-specific combined parallelism value that is smaller than the updated core-specific difference.

14. The method of claim 9, in which:

the processor includes a set of cores, each core supporting multiple threads;

the parallelism value for each pending process of the set of pending processes is based on MLP; and the set of scheduled processes is further determined by, for each core of the set of cores:

adding, to the set of scheduled processes, a first core-specific selected process of the set of pending processes having a core-specific smallest parallelism value;

calculating a core-specific difference between the parallelism threshold and the core-specific smallest parallelism value associated with the first core-specific selected process;

adding, to the set of scheduled processes, a second core-specific selected process of the set of pending processes having a next core-specific smallest parallelism value;

calculating an updated core-specific difference between the parallelism threshold and a core-specific sum of the core-specific smallest parallelism value and the next core-specific smallest parallelism value;

adding a third core-specific selected process having a core-specific largest parallelism value that is less than the updated core-specific difference to the set of scheduled processes, in response to no combination of unscheduled processes having a core-specific combined parallelism value that is smaller than the updated core-specific difference; and the adding pending processes further comprises adding, to each core of the set of cores not assigned one of the scheduled processes of the set of scheduled processes, a smallest unassigned pending processes associated with the smallest parallelism value, in response to the parallelism threshold having been met.

15. An apparatus, comprising:

at least one memory; and at least one processor coupled to the at least one memory, the at least one processor configured to:

determine a parallelism value for each pending process of a set of pending processes based on instruction level parallelism (ILP) or memory level parallelism (MLP) for the respective pending process, each pending process of the set of pending processes being a single-threaded process;

sort each pending process of the set of pending processes based on the respective process' parallelism value; and determine, from the set of pending processes, a set of scheduled processes for a processor based on a parallelism threshold associated with the processor, a process threshold associated with the processor, and the sorting, the set of scheduled processes determined by:

adding pending processes of the set of pending processes to the set of scheduled processes unless a quantity of scheduled processes is equal to the process threshold; and removing pending processes from the set of pending processes once the respective pending process is added to the set of scheduled processes.

16. The apparatus of claim 15, in which the apparatus further comprises performance counters configured to indicate the parallelism value for each pending process of the set of pending processes via a sliding memory window, the performance counters stored in a process control block.

17. The apparatus of claim 15, in which the at least one processor is further configured to determine the set of scheduled processes by tracking an age value for each pending process of the set of pending processes and adding, to the set of scheduled processes, pending processes associated with age values above an age threshold.

18. The apparatus of claim 15, in which the at least one processor is further configured to:

add to the set of scheduled processes a selected process, of the set of pending processes, having a largest parallelism value;

calculate a difference between the parallelism threshold and the largest parallelism value associated with the selected process; and add to the set of scheduled processes a pending process having the largest parallelism value that is less than the difference.

19. The apparatus of claim 15, in which the at least one processor is further configured to:

add, to the set of scheduled processes, a first selected process of the set of pending processes having a smallest parallelism value;

calculate a difference between the parallelism threshold and the parallelism value associated with the first selected process;

add, to the set of scheduled processes, a second selected process of the set of pending processes having a next smallest parallelism value;

calculate an updated difference between the parallelism threshold and a sum of the smallest parallelism value and the next smallest parallelism value; and add a third selected process having a largest parallelism value that is less than the updated difference to the set of scheduled processes, in response to no combination of unscheduled processes having a combined parallelism value that is smaller than the updated difference.

20. An apparatus, comprising:

means for determining a parallelism value for each pending process of a set of pending processes based on instruction level parallelism (ILP) or memory level parallelism (MLP) for the respective pending process, each pending process of the set of pending processes being a single-threaded process;

means for sorting each pending process of the set of pending processes based on the respective process' parallelism value; and means for determining, from the set of pending processes, a set of scheduled processes for a processor based on a parallelism threshold associated with the processor, a process threshold associated with the processor, and the sorting, the set of scheduled processes determined by:

adding pending processes of the set of pending processes to the set of scheduled processes unless a quantity of scheduled processes is equal to the process threshold; and removing pending processes from the set of pending processes once the respective pending process is added to the set of scheduled processes.

* * * * *